(12) United States Patent
Takahashi et al.

(10) Patent No.: US 9,646,221 B2
(45) Date of Patent: May 9, 2017

(54) IMAGE RECOGNITION APPARATUS AND STORAGE MEDIUM

(71) Applicants: NEC Corporation, Tokyo (JP); NEC Solution Innovators, Ltd., Tokyo (JP)

(72) Inventors: Katsuhiko Takahashi, Tokyo (JP); Masateru Mori, Tokyo (JP)

(73) Assignees: NEC Corporation, Tokyo (JP); NEC Solution Innovators, Ltd., Tokyo (JP)

(*) Notice: Subject to any disclaimer, the term of this patent is extended or adjusted under 35 U.S.C. 154(b) by 0 days.

(21) Appl. No.: 14/904,356

(22) PCT Filed: Jul. 24, 2013

(86) PCT No.: PCT/JP2013/070032
§ 371 (c)(1),
(2) Date: Jan. 11, 2016

(87) PCT Pub. No.: WO2015/011799
PCT Pub. Date: Jan. 29, 2015

(65) Prior Publication Data
US 2016/0155012 A1 Jun. 2, 2016

(51) Int. Cl.
*G06K 9/36* (2006.01)
*G06K 9/46* (2006.01)
*G06K 9/00* (2006.01)

(52) U.S. Cl.
CPC ....... *G06K 9/4633* (2013.01); *G06K 9/00986* (2013.01)

(58) Field of Classification Search
CPC ............ G06K 9/4633; G06K 9/00986; G06K 9/6232; G06K 9/00818; H04N 7/30; G01J 3/2823; G06F 17/145; G06T 2207/20061
See application file for complete search history.

(56) References Cited

U.S. PATENT DOCUMENTS 7,397,970 B2 * 7/2008 Han ..................... F41G 7/2226
                                                          382/103
7,406,212 B2 * 7/2008 Mohamed ............ G06K 9/4633
                                                          382/248

(Continued)

FOREIGN PATENT DOCUMENTS

JP       06-119447        4/1994
JP       07-220081        8/1995

(Continued)

OTHER PUBLICATIONS

International Search Report corresponding to PCT/JP2013/070032, mail date Oct. 29, 2013, 1 page.

(Continued)

*Primary Examiner* — Amir Alavi
(74) *Attorney, Agent, or Firm* — Wilmer Cutler Pickering Hale and Dorr LLP

(57) ABSTRACT

A field-programmable gate array (FPGA) coarse Hough transform unit (102) performs on an FPGA a first coarse-precision Hough transform upon an image that has been applied as input to an image input unit (101), and supplies candidate location information obtained by the first Hough transform and the image to an external memory (103). A fine Hough transform unit (104) reads the candidate location information and the image stored in the external memory (103), uses the candidate location information to perform, on a general-purpose processor, a second detailed-precision Hough transform upon the image, and supplies detailed-precision location information of a two-dimensional pattern that is the object of recognition within the image to the external memory (103).

6 Claims, 14 Drawing Sheets

(56) References Cited

U.S. PATENT DOCUMENTS

| | | | | |
|---|---|---|---|---|
| 7,948,493 B2* | 5/2011 | Klefenz | ............... | G06K 9/0061 |
| | | | | 345/441 |
| 8,170,340 B2* | 5/2012 | Klefenz | ............. | G06K 9/00818 |
| | | | | 348/148 |
| 9,030,559 B2* | 5/2015 | Saha | .................... | G05D 1/0246 |
| | | | | 348/148 |
| 9,053,389 B2* | 6/2015 | Poyil | .................. | G06K 9/00818 |
| 2016/0155012 A1* | 6/2016 | Takahashi | ............ | G06K 9/4633 |
| | | | | 382/281 |

FOREIGN PATENT DOCUMENTS

| | | |
|---|---|---|
| JP | 11-110561 | 4/1999 |
| JP | 2002-259994 | 9/2002 |
| JP | 4065460 | 3/2008 |
| JP | 2009-510571 A | 3/2009 |
| JP | 2013-052615 | 3/2013 |

OTHER PUBLICATIONS

Duda, Richard O. and Peter E. Hart; Use of the Hough Transformation to Detect Lines and Curves in Pictures, Communications of the ACM, vol. 15, No. 1, pp. 11-15 (Jan. 1972).
Takahashi, Kenichi, et al., Circuit Generation using High-Level Synthesis Tool in Reconfigurable HPC System Based on FPGA Arrays; The Institute of Electronics, Information and Communication Engineers; Technical Report, vol. 110, No. 319, Nov. 23, 2010 (11 pages).
Japanese Office Action issued in corresponding Japanese Patent Application No. 2015-528061, dated Mar. 14, 2017, 4 pages.

* cited by examiner

Fig.1

|  |  | Amount of Computation | Memory Capacity Necessary for Processing |
|---|---|---|---|
| Ordinary Hough Transform | | Extremely Large | Extremely Large |
| Coarse-Fine Hough transform | Coarse-precision Hough transform | Large | Medium |
| | Detailed-precision Hough transform | Small | Small |

Fig.2

|  | Speed of Computation | Flexibility | Memory Capacity |
|---|---|---|---|
| General-purpose processor | × Low Speed | ○ Great | ○ Large |
| FPGA | ○ Extreme High Speed | △ Medium | × Small |

Fig.3

| Hardware | Method | Appropriate/ Inappropriate | Reason |
|---|---|---|---|
| General-purpose processor | Ordinary Hough transform | × | Real-time processing extremely difficult |
| | Coarse-Fine Hough transform | △ | Real-time processing difficult |
| FPGA | Ordinary Hough transform | × | Implementation not possible |
| | Coarse-Fine Hough transform | × | Implementation not possible |

Fig.9

| Processing Allotted to Hardware | Hardware Characteristics | | | Characteristics of Allotted Processing | | |
|---|---|---|---|---|---|---|
| | Computing Performance | Memory Capacity | Random Access to Image | Amount of Computation | Necessary Memory | Random Access to Image |
| General-purpose processor Detailed-precision Hough transform | Low | Large | Possible | Small | Small | Present |
| FPGA Coarse-precision Hough transform | High | Small | Not possible | Large | Small | None |

Fig.13

| | Voting range when the entirety is held in the voting range | | When the height of the voting space is limited | | Minimum value of the corresponding Y coordinate | | | | | | | | | |
|---|---|---|---|---|---|---|---|---|---|---|---|---|---|---|
| Y | ※A | ※B | ※A | ※B | 0 | 1 | 2 | 3 | 4 | 5 | 6 | 7 | 8 | 9 |
| 70 | 7 | 15 | 7 | 5 | 60 | 66 | 72 | 78 | 84 | 90 | 36 | 42 | 48 | 54 |
| 71 | 7 | 16 | 7 | 6 | 60 | 66 | 72 | 78 | 84 | 90 | 96 | 42 | 48 | 54 |
| 72 | 8 | 16 | 8 | 6 | 60 | 66 | 72 | 78 | 84 | 90 | 96 | 102 | 48 | 54 |
| 73 | 8 | 16 | 8 | 6 | 60 | 66 | 72 | 78 | 84 | 90 | 96 | 102 | 48 | 54 |
| 74 | 8 | 16 | 8 | 6 | 60 | 66 | 72 | 78 | 84 | 90 | 96 | 102 | 48 | 54 |
| 75 | 8 | 16 | 8 | 6 | 60 | 66 | 72 | 78 | 84 | 90 | 96 | 102 | 48 | 54 |
| 76 | 8 | 16 | 8 | 6 | 60 | 66 | 72 | 78 | 84 | 90 | 96 | 102 | 48 | 54 |
| 77 | 8 | 17 | 8 | 7 | 60 | 66 | 72 | 78 | 84 | 90 | 96 | 102 | 48 | 54 |
| 78 | 9 | 17 | 9 | 7 | 60 | 66 | 72 | 78 | 84 | 90 | 96 | 102 | 108 | 54 |
| 79 | 9 | 17 | 9 | 7 | 60 | 66 | 72 | 78 | 84 | 90 | 96 | 102 | 108 | 54 |
| 80 | 9 | 17 | 9 | 7 | 60 | 66 | 72 | 78 | 84 | 90 | 96 | 102 | 108 | 54 |
| 81 | 9 | 17 | 9 | 7 | 60 | 66 | 72 | 78 | 84 | 90 | 96 | 102 | 108 | 54 |
| 82 | 9 | 17 | 9 | 7 | 60 | 66 | 72 | 78 | 84 | 90 | 96 | 102 | 108 | 54 |
| 83 | 9 | 18 | 9 | 8 | 60 | 66 | 72 | 78 | 84 | 90 | 96 | 102 | 108 | 54 |
| 84 | 10 | 18 | 0 | 8 | 60 | 66 | 72 | 78 | 84 | 90 | 96 | 102 | 108 | 114 |
| 85 | 10 | 18 | 0 | 8 | 60 | 66 | 72 | 78 | 84 | 90 | 96 | 102 | 108 | 114 |
| 86 | 10 | 18 | 0 | 8 | 60 | 66 | 72 | 78 | 84 | 90 | 96 | 102 | 108 | 114 |
| 87 | 10 | 18 | 0 | 8 | 60 | 66 | 72 | 78 | 84 | 90 | 96 | 102 | 108 | 114 |
| 88 | 10 | 18 | 0 | 8 | 60 | 66 | 72 | 78 | 84 | 90 | 96 | 102 | 108 | 114 |
| 89 | 10 | 19 | 0 | 9 | 60 | 66 | 72 | 78 | 84 | 90 | 96 | 102 | 108 | 114 |
| 90 | 11 | 19 | 1 | 9 | 120 | 66 | 72 | 78 | 84 | 90 | 96 | 102 | 108 | 114 |
| 91 | 11 | 19 | 1 | 9 | 120 | 66 | 72 | 78 | 84 | 90 | 96 | 102 | 108 | 114 |
| 92 | 11 | 19 | 1 | 9 | 120 | 66 | 72 | 78 | 84 | 90 | 96 | 102 | 108 | 114 |
| 93 | 11 | 19 | 1 | 9 | 120 | 66 | 72 | 78 | 84 | 90 | 96 | 102 | 108 | 114 |
| 94 | 11 | 19 | 1 | 9 | 120 | 66 | 72 | 78 | 84 | 90 | 96 | 102 | 108 | 114 |
| 95 | 11 | 20 | 1 | 0 | 120 | 66 | 72 | 78 | 84 | 90 | 96 | 102 | 108 | 114 |
| 96 | 12 | 20 | 2 | 0 | 120 | 126 | 72 | 78 | 84 | 90 | 96 | 102 | 108 | 114 |
| 97 | 12 | 20 | 2 | 0 | 120 | 126 | 72 | 78 | 84 | 90 | 96 | 102 | 108 | 114 |
| 98 | 12 | 20 | 2 | 0 | 120 | 126 | 72 | 78 | 84 | 90 | 96 | 102 | 108 | 114 |
| 99 | 12 | 20 | 2 | 0 | 120 | 126 | 72 | 78 | 84 | 90 | 96 | 102 | 108 | 114 |
| 100 | 12 | 20 | 2 | 0 | 120 | 126 | 72 | 78 | 84 | 90 | 96 | 102 | 108 | 114 |
| 101 | 12 | 21 | 2 | 1 | 120 | 126 | 72 | 78 | 84 | 90 | 96 | 102 | 108 | 114 |
| 102 | 13 | 21 | 3 | 1 | 120 | 126 | 132 | 78 | 84 | 90 | 96 | 102 | 108 | 114 |
| 103 | 13 | 21 | 3 | 1 | 120 | 126 | 132 | 78 | 84 | 90 | 96 | 102 | 108 | 114 |
| 104 | 13 | 21 | 3 | 1 | 120 | 126 | 132 | 78 | 84 | 90 | 96 | 102 | 108 | 114 |
| 105 | 13 | 21 | 3 | 1 | 120 | 126 | 132 | 78 | 84 | 90 | 96 | 102 | 108 | 114 |
| 106 | 13 | 21 | 3 | 1 | 120 | 126 | 132 | 78 | 84 | 90 | 96 | 102 | 108 | 114 |
| 107 | 13 | 22 | 3 | 2 | 120 | 126 | 132 | 78 | 84 | 90 | 96 | 102 | 108 | 114 |

※A : Minimum value of the voting destination y coordinate
※B : Maximum value of the voting destination y coordinate

IMAGE RECOGNITION APPARATUS AND STORAGE MEDIUM

CROSS-REFERENCE TO RELATED APPLICATIONS

This application is a national stage application of International Application No. PCT/JP2013/070032 entitled "IMAGE RECOGNITION APPARATUS AND STORAGE MEDIUM," filed on Jul. 24, 2013, the disclosure of which is hereby incorporated by reference in its entirety.

TECHNICAL FIELD

The present invention relates to an image recognition apparatus chiefly to be incorporated that recognizes two-dimensional patterns that are the object of recognition from within an image in real time.

BACKGROUND ART

The Hough transform is known as a method for efficiently recognizing two-dimensional figures having few changes in shape from within an image. This Hough transform is disclosed in, for example, Non-Patent Document 1 or Patent Document 1. In Non-Patent Document 1, a method is disclosed that recognizes a figure such as a straight line by means of a Hough transform. This method finds a line by modeling a line by two variables that take the radius $\rho$ and angle of rotation $\Theta$ as variables, carrying out a voting process using two-dimensional voting space, and then searching for the $\rho$ value and $\Theta$ value for which the vote value is a maximum. Non-Patent Document 1 also discloses a method of recognizing circles, which are two-dimensional patterns. When recognizing a circle, a voting space composed of the three variables of the x coordinate and y coordinate of the center point and the radius is used to extract points for which the voting values are maximums. Thus, a Hough transform that uses a single voting space to extract from that space the location for which the vote value is large to find a solution is referred to as a normal Hough transform in the following explanation to distinguish it from the Hough transform that will described hereinbelow.

In addition, a method in which a normal Hough transform is improved to efficiently perform a rotational correction for character recognition is disclosed in Patent Document 1. In Patent Document 1, an image processing device is disclosed that, in order to efficiently find the rotational angle of a character pattern, carries out a coarse-precision Hough transform to determine a coarse-precision angle of distortion, sets a second voting space that is limited to the vicinity of this distortion angle that has been determined and that is more finely demarcated to again carry out a Hough transform, and takes as the solution the detailed distortion angle that is obtained as a result. This method has the advantage of enabling a decrease of the memory resources necessary for holding a voting space compared to preparing one fine-precision voting space to find a solution by a normal Hough transform. In this way, the process of carrying out a coarse-precision Hough transform to first find a coarse-precision solution and then carrying out a detailed-precision Hough transform limited to only the vicinity of the coarse-precision solution to obtain the final solution is referred to as a coarse-fine Hough transform in the following explanation. In addition, regarding the amount of computation that the coarse-precision Hough transform and detailed-precision Hough transform involve, the coarse-precision Hough transform involves a far greater amount of computation when there are only a few two-dimensional patterns that are the objects of recognition in the input image.

FIG. 1 shows a table that summarizes the amount of computation and memory that are required in a normal Hough transform and a coarse-fine Hough transform. Regarding the coarse-fine Hough transform, the amount of computation and the amount of required memory are each shown for the coarse-precision Hough transform and the detailed-precision Hough transform. As shown in FIG. 1, the normal Hough transform is characterized in that it requires an extremely large amount of both computation and memory. The coarse-precision Hough transform of the coarse-fine Hough transform can be regarded as requiring a large amount of computation but a medium amount of memory. The detailed-precision Hough transform is characterized in that it requires a small amount of both computation and memory.

As regards a different technological aspect, hardware that is to be incorporated into an image processing apparatus is described with reference to FIG. 2. Typically, hardware that has been designed specialized for special purposes is frequently used in image processing apparatuses directed to incorporation, but with advances in computer technology, structures are increasingly used in recent years that combine general-purpose processors with programs. These structures can take advantage of software flexibility to enhance various capabilities, and further, have the advantage of decreasing development time and costs because they do not use hardware that consumes a huge amount of development time and that is expensive. A large-capacity memory can also be arranged outside the general-purpose processor to easily realize processing that requires large-capacity memory. However, disadvantage is that the processing speed is slower than dedicated hardware.

Alternatively, another means of realizing an image processing apparatus directed to incorporation in recent years that can be offered is FPGA (Field-Programmable Gate Array) in which, although it is hardware, has a certain degree of flexibility that allows modifying the circuit configuration and the functions via programming. While FPGA has the advantage of extremely fast computation owing to the fact that it is hardware, it also has a limitation in which the capacity of the memory that is provided internally is small. In the case of hardware in which the provided memory is external, data can be sent and received between the FPGA and the external memory, but the slow data read speed from external memory raises the concern that full advantage cannot be taken of the high-speed computing capability of the hardware when reading data from the external memory.

LITERATURE OF THE PRIOR ART

Patent Documents

Patent Document 1: Japanese Patent No. 4065460, Image Processing Method and Device, claim 3

Non-Patent Document

Non-Patent Document 1: *Use of the Hough Transformation to Detect Lines and Curves in Pictures*, Communications of the ACM, Vol. 15, No. 1, pp. 11-15 (1972.1)

SUMMARY OF THE INVENTION

Problem to be Solved by the Invention

Nevertheless, the configuration of an incorporated image recognition apparatus that recognizes two-dimensional patterns from within an image in real time by simply combining typical known technology entails the problems as described below.

First, constructing an incorporated image processing apparatus from a general-purpose processor enables the use of a normal Hough transform or coarse-fine Hough transform to realize recognition of two-dimensional patterns. However, because the computation capability of a general-purpose processor directed to an incorporated image processing apparatus is not sufficiently high, the problem arises in which, depending on conditions such as the size of the input image or the size of the voting space, processing such as recognizing specific two-dimensional patterns from within an image of VGA (Video Graphics Array) size (640 pixels horizontally×480 pixels vertically) becomes problematic in real time.

Next, constructing an incorporated image processing apparatus from FPGA enables the implementation of basic operations in a normal Hough transform. However, a problem arises in which it is difficult to secure in FPGA voting space that is needed for recognizing two-dimensional patterns. As an example, recognition of circles from within a VGA size image will be explained using actual numerical values for the voting space. Because a minimum of three parameters the center x coordinate, the center y coordinate, and the radius r are required to represent a circle, the voting space is three dimensions. If the center coordinates and the radius are to be found at a precision of one pixel and the radius of the circle that is the object of recognition is assumed to be from ten pixels to 29 pixels, the number of bins of voting space is 640×480×20=6,144,000. If one bin is represented by eight bits, a memory of 6.144 MB is necessary, and this memory cannot be held in the FPGA.

In addition, in a case of using a coarse-fine Hough transform on an incorporated image processing apparatus that is made up of FPGA to recognize two-dimensional patterns, if the center coordinates and radius in the coarse-precision Hough transform are to be found at a precision of six pixels, the number of bins of voting space is (640/6)=(480/6)×(20/6)=107×80×4=34,240. If one bin is represented by eight bits, a memory of a little over 34 KB is sufficient, and the coarse-precision Hough transform can be implemented by FPGA. However, because slightly more than 640×480=300 KB is necessary as the memory for holding the input image for realizing a detailed-precision Hough transform on FPGA, the implementation of a coarse-fine Hough transform on an incorporated image processing apparatus made up of FPGA is problematic.

The preceding explanation is summarized as shown in FIG. 3. Essentially, using a general-purpose processor or FPGA to realize Hough transform processing to recognize two-dimensional patterns in real time is not possible by the current known technology, as described hereinabove.

The present invention therefore has the object of providing an image recognition apparatus and storage medium that can solve the above-described problems.

Means for Solving the Problem

The image recognition apparatus of the present invention includes:
image input means that receives an image;
external memory that stores information;
FPGA coarse Hough transform means that performs, on a FPGA (Field-Programmable Gate Array), a first coarse-precision Hough transform upon an image that is received as input in the image input means, and supplies the image and candidate location information that was obtained by the first Hough transform to the external memory; and
fine Hough transform means that operates on a general-purpose processor and that reads the candidate location information and the image that were stored in the external memory, uses the candidate location information to perform a second detailed-precision Hough transform upon the image, and supplies detailed-precision location information for two-dimensional patterns that are the object of recognition in the image to the external memory.

The storage medium of the present invention is a storage medium that stores a program for causing a computer to execute procedures of:
receiving an image;
performing, on a FPGA (Field-Programmable Gate Array), a first coarse-precision Hough transform upon the image that was received;
supplying candidate location information that was obtained in the first Hough transform and the image to an external memory; and
causing a general-purpose processor to execute processes of: reading the candidate location information and the image that were stored in the external memory, using the candidate location information to perform a second detailed-precision Hough transform upon the image, and supplying detailed-precision location information for two-dimensional patterns that are the object of recognition in the image to the external memory.

Effect of the Invention

The present invention enables the realization of an image recognition apparatus that recognizes two-dimensional patterns from within an image in real time.

BRIEF DESCRIPTION OF THE DRAWINGS

FIG. 1 shows a table for summarizing the characteristics regarding the amount of computation and the memory capacity that are necessary for processing relating to a normal Hough transform and a coarse-fine Hough transform.

FIG. 2 shows a table for summarizing the characteristics regarding the speed of computation, memory capacity, and flexibility relating to a general-purpose processor and FPGA.

FIG. 3 is a table summarizing information indicating adequacy and inadequacy of real-time recognition of two-dimensional patterns by simple combinations of typical known hardware and Hough transform.

FIG. 9 is a table summarizing the characteristics of a general-purpose processor and FPGA and the features of the coarse-precision Hough transform and detailed-precision Hough transform that are executed on each.

FIG. 13 shows the Y coordinates in an input image that is of interest, the range of the y coordinates for which votes are cast and the range (minimum Y coordinate value) on the input image coordinate system that corresponds to the y coordinates of voting space when the pixel that is of interest is a pixel that relates to voting.

BEST MODE FOR CARRYING OUT THE INVENTION

An exemplary embodiment of the present invention is next described with reference to the accompanying drawings.

Figure 4:
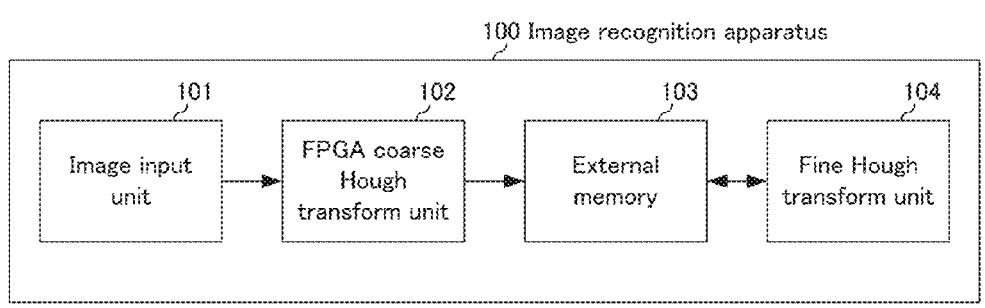
FIG. 4 shows an exemplary embodiment of the present invention.

Referring to FIG. 4, an exemplary embodiment of image recognition apparatus 100 of the present invention is disclosed that is made up of: image input unit 101 that receives an image, FPGA coarse Hough transform unit 102 that carries out a coarse Hough transform (first Hough transform) on FPGA, external memory 103 that stores output information from FPGA coarse Hough transform unit 102 and output information from fine Hough transform unit 104, and fine Hough transform unit 104 that carries out a detailed-precision Hough transform (second Hough transform) on a general-purpose processor.

Image input unit 101 inputs into the image recognition apparatus an image captured by a camera as digital image data (input image) and supplies the image to FPGA coarse Hough transform unit 102. The image data is, for example, a luminance image in which one pixel is represented by one byte and has a horizontal resolution of 640 pixels and a vertical resolution of 480 pixels.

FPGA coarse Hough transform unit 102 is provided on FPGA and executes a coarse-precision Hough transform upon image data supplied from image input unit 101. FPGA coarse Hough transform unit 102 further supplies the result of the Hough transform to external memory 103. The method of computing the Hough transform is described in detail in, for example, Non-Patent Document 1, but because the implementation of a coarse-precision Hough transform on FPGA is one important point in the present invention, this point will be described in detail. The Hough transform used here, together with the Hough transform in fine Hough transform unit 104, can recognize a complex two-dimensional pattern through the use of a generalized Hough transform. A coarse-precision Hough transform is a Hough transform in a predetermined range (a range that includes a predetermined plurality of pixels (for example, six pixels)).

Figure 5:
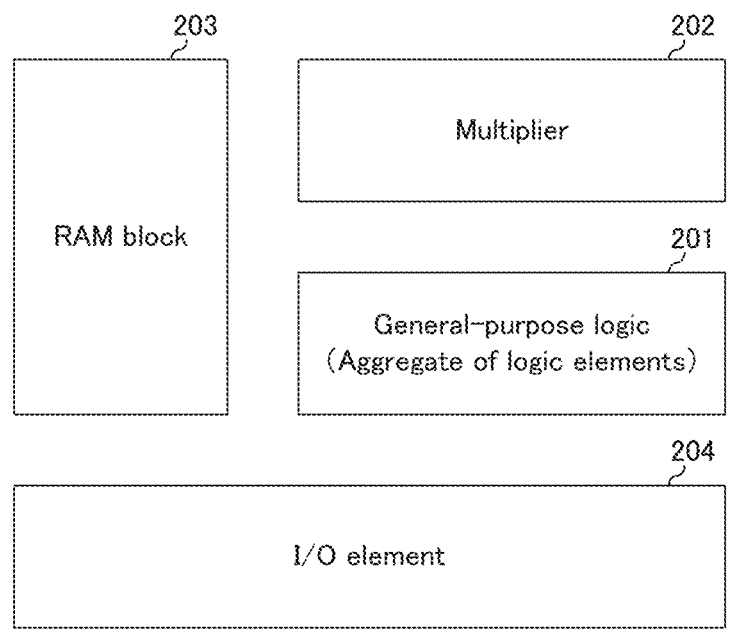
FIG. 5 shows the hardware construction of FPGA.

FIG. 5 shows the hardware construction of FPGA. FPGA is mainly made up of general-purpose logic 201, multiplier 202 RAM block 203, I/O element 204, and a PLL block (not shown).

General-purpose logic 201 is a large-scale aggregate of logic elements that perform basic logic operations. A single logic element is made by a look-up table and a register, and various functions can be realized by altering the content of the look-up table and by combining the logic elements in accordance with a program.

Multiplier 202 is hardware that processes the multiplication of data at high speed. A circuit that carries out multiplication can also be configured by general-purpose logic 201, but a circuit dedicated to multiplication is provided because in a package that employs general-purpose logic 201, the usage amount of the logic elements increases and efficiency suffers.

RAM block 203 is a circuit block that can be used as typical memory. RAM block 203 can be configured by using logic elements, similar to multiplier 202 but a configuration is adopted that is provided with a dedicated high efficiency circuit as memory. A large-capacity memory of several GB to several tens of GB can typically be used in, for example, a personal computer, but RAM block 203 in FPGA is on the order of several MB even on the high end, and several tens of KB to several hundred KB or less is typical of a middle class or smaller FPGA.

I/O element 204 is a circuit that conducts the exchange of signals inside and outside the FPGA.

The PLL block is a circuit that supplies clock signals to the entire FPGA.

Figure 6:
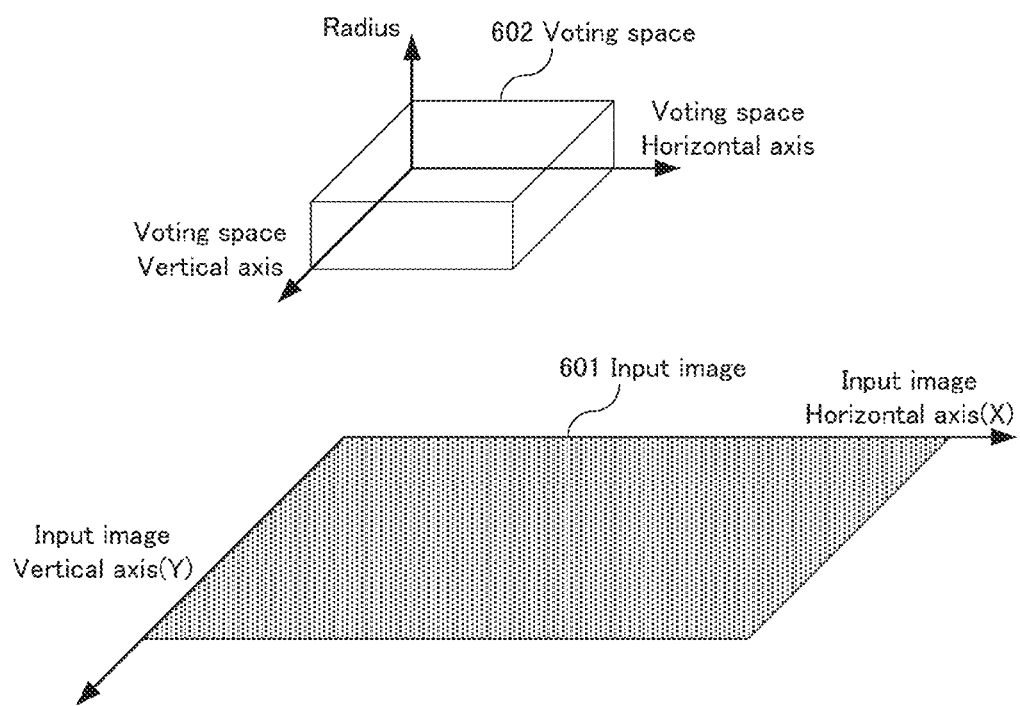
FIG. 6 shows an example of voting space in the FPGA coarse Hough transform unit shown in FIG. 4.

When carrying out image processing, input image 601 that is received from image input unit 101 is applied in raster-scan order from the upper left and toward the lower right such as shown in the lower part of FIG. 6, and from minute to minute is exchanged among general-purpose logic 201, multiplier 202 RAM block 203, and I/O element 204 in accordance with the programmed connections, and the final result is supplied. As already described, the RAM block capacity in FPGA is typically as small as several hundred KB, and it is therefore difficult to hold the entire input image. As a result, implementation is difficult unless the image data that is received as input can be processed in raster-scan order and processing allows operations in which only several lines of image data are held in RAM block 203.

This difficulty is explained taking as an example the problem of recognizing a circle as a two-dimensional pattern. When recognizing a circle, a process should be repeated of using voting space 602 for the three parameters of the center (x, y) coordinates and the radius such as shown in FIG. 6, and, in the simplest form, focusing on each pixel in raster-scan order, carrying out a voting process in voting space where there is a possibility that these pixels are points on a circumference. As a result, there is absolutely no need to hold the input image. In addition, there is a method in which the direction of the gradient is used to decrease the number of instances of voting, and because this case also requires the ability to hold only the most recent several lines of input image information to find the direction of inclination and consequently does not necessitate holding the entire input image, this method can also be considered a process that allows conversion to FPGA.

Regarding the memory for holding voting space, because this is a coarse-precision Hough transform, if the horizontal resolution of the input image data is 640 pixels and the vertical resolution is 480 pixels, the horizontal and vertical resolution of voting space is in six-pixel units (i.e., the number of horizontal and vertical bin divisions of voting space are each ⅙ of the number of horizontal and vertical pixels of input image data), the range of the radius is 10-39 pixels, the resolution of the radius of voting space is in six-pixel units (i.e., the number of bin divisions relating to radius of voting space is (39−10+1)/6=5), and the voting value fits in 1 byte, then the necessary memory size for holding an entire search space is:

(640/6)×(480/6)×((39+1−10)/6)=107×80×5=42.8 KB this is the size that can be held on FPGA.

Since it is not necessary to hold an entire input image, a coarse-precision Hough transform can be implemented on FPGA.

There are several means for extracting a circle based on the vote value of each bin of voting space. Each vote value may be examined, n values are selected starting from larger values from among vote values that give a maximum value in a local region, and n sets of corresponding circle center coordinates and radii are then extracted. Alternatively, points at which a predetermined threshold value is surpassed may be selected from among vote values that give maximum values within a local region and the corresponding circle center coordinates and radii are then extracted. The number of sets of circle center coordinates and radii that are extracted in the later means becomes variable, but an upper limit may be placed on the number of sets. The circle center coordinates and radii results of coarse-precision that are extracted by these standards are written to external memory 103. In the present invention, information of circles that is extracted by the coarse-precision Hough transform is information that indicates circle candidates, and the final circles are identified by fine Hough transform unit 104, to be described. The information of the circle center coordinates and radii extracted by the coarse-precision Hough transform is here referred to as center candidate information (candidate location information). In addition, circles indicated by the center candidate information that is extracted by FPGA coarse Hough transform unit 102 are also discarded in the processing in fine Hough transform unit 104.

FPGA coarse Hough transform unit 102 further supplies the input image data that was received from image input unit 101 to external memory 103. This process is performed parallel to the coarse-precision Hough transform process, and because the process is a burst writing process, its influence upon the processing time is negligible.

External memory 103 holds information that is exchanged by each constituent element. The information that is exchanged among each of the constituent elements is the information shown in Table 1 and Table 2.

TABLE 1

| Information Written to External Memory 103 | Constituent Element that Performs Writing |
| --- | --- |
| Input image | FPGA coarse Hough transform unit 102 |
| Center candidate information (coarse-precision) | FPGA coarse Hough transform unit 102 |
| Detailed circle center coordinates and radius | Fine Hough transform unit 104 |

TABLE 2

| Information Read From External Memory 103 | Constituent Element that Performs Reading |
| --- | --- |
| Input image | FPGA coarse Hough transform unit 102 and fine Hough transform unit 104 |
| Center candidate information (coarse-precision) | Fine Hough transform unit 104 |

The detailed circle center coordinates and radii shown in Table 1 are composed of information that corresponds to the number of centers extracted in fine Hough transform unit 104.

Fine Hough transform unit 104 that is carried out on a general-purpose processor extracts center candidate information of circles that are stored in external memory 103 one item at a time and uses high-resolution voting space to find detailed values for center (x, y) coordinates and radii. In addition, fine Hough transform unit 104 further reads from external memory 103 an image of a corresponding small region (local region), carries out a fine Hough transform in which the resolution is set finer than the resolution used in the Hough transform in FPGA coarse Hough transform unit 102, and again supplies detailed information of the circle center coordinates and radii that are supplied to external memory 103.

The resolution of the voting space in fine Hough transform unit 104 may be, for example, the resolution of input image 601 i.e., may be made equal to the number of pixels of the input image. If the vertical and horizontal resolution and resolution of the radii in FPGA coarse Hough transform unit 102 are both six-pixel units, the center candidate information can be considered to have an error on the order of six pixels (or from −3 pixels to +3 pixels). As a result, the number of bins of voting space in fine Hough transform unit 104 may be made horizontally 6×vertically 6×radii 6=216. Estimating the error on the high side, voting space may be provided in which the number of bins is made slightly greater.

Figure 7:
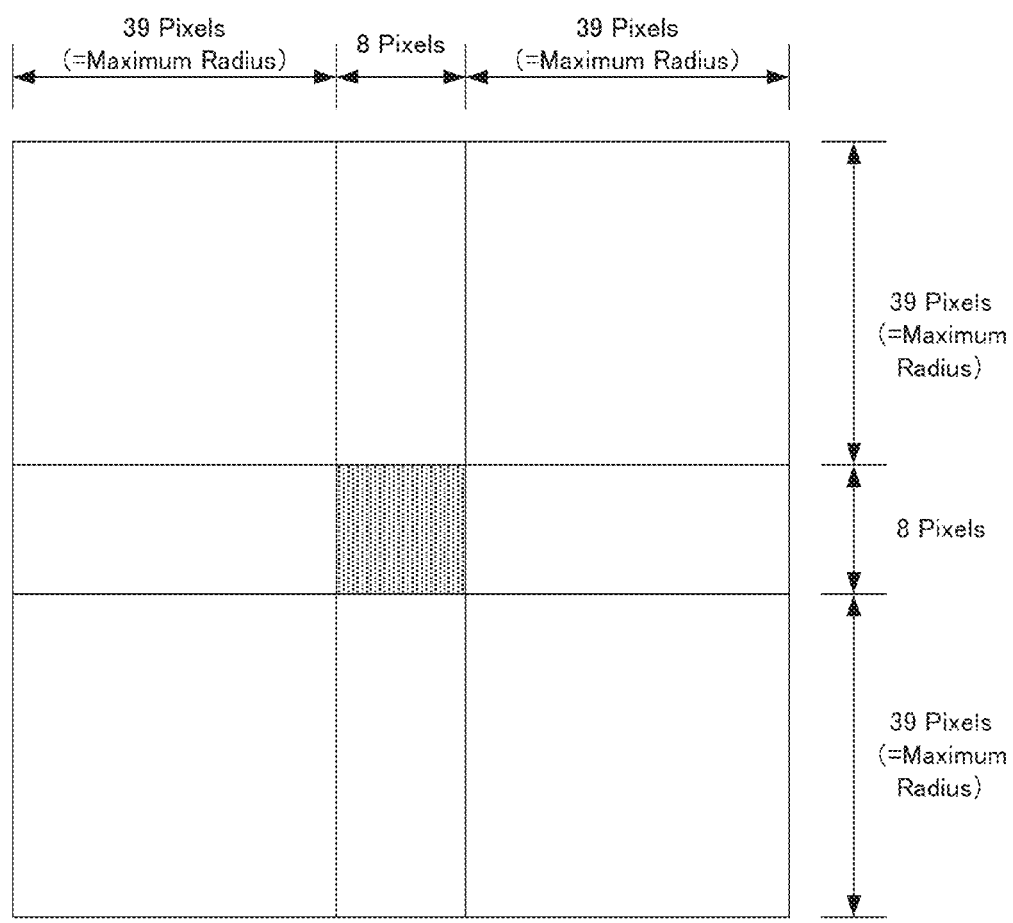
FIG. 7 shows the range of an input image that is consulted when carrying out processing upon one item of center candidate information in the fine Hough transform unit shown in FIG. 4.

If the radius of a circle that is the object of recognition is a maximum of 39 pixels, the range of the input image for which votes are cast to the above-described voting space is limited to a range that is increased by 39 pixels vertically and horizontally in the x and y ranges of the voting space as shown in FIG. 7. In other words, there is no need to scan the entire input image in fine Hough transform unit 104 and the Hough transform process only needs to be carried out for a local region. In contrast with FPGA, a critical point regarding a general-purpose processor is its ability to easily carry out processing upon the data of a local region in external memory. The center candidate information supplied by FPGA coarse Hough transform unit 102 is not voluminous, and moreover, fine Hough transform unit 104 only needs to carry out Hough transform upon local regions that correspond to each item of center candidate information. As a result, detailed-precision Hough transforms require far less computation than do coarse-precision Hough transforms. Therefore, processing can be carried out in real time even in the case of a general-purpose processor of an incorporated apparatus.

Figure 8:
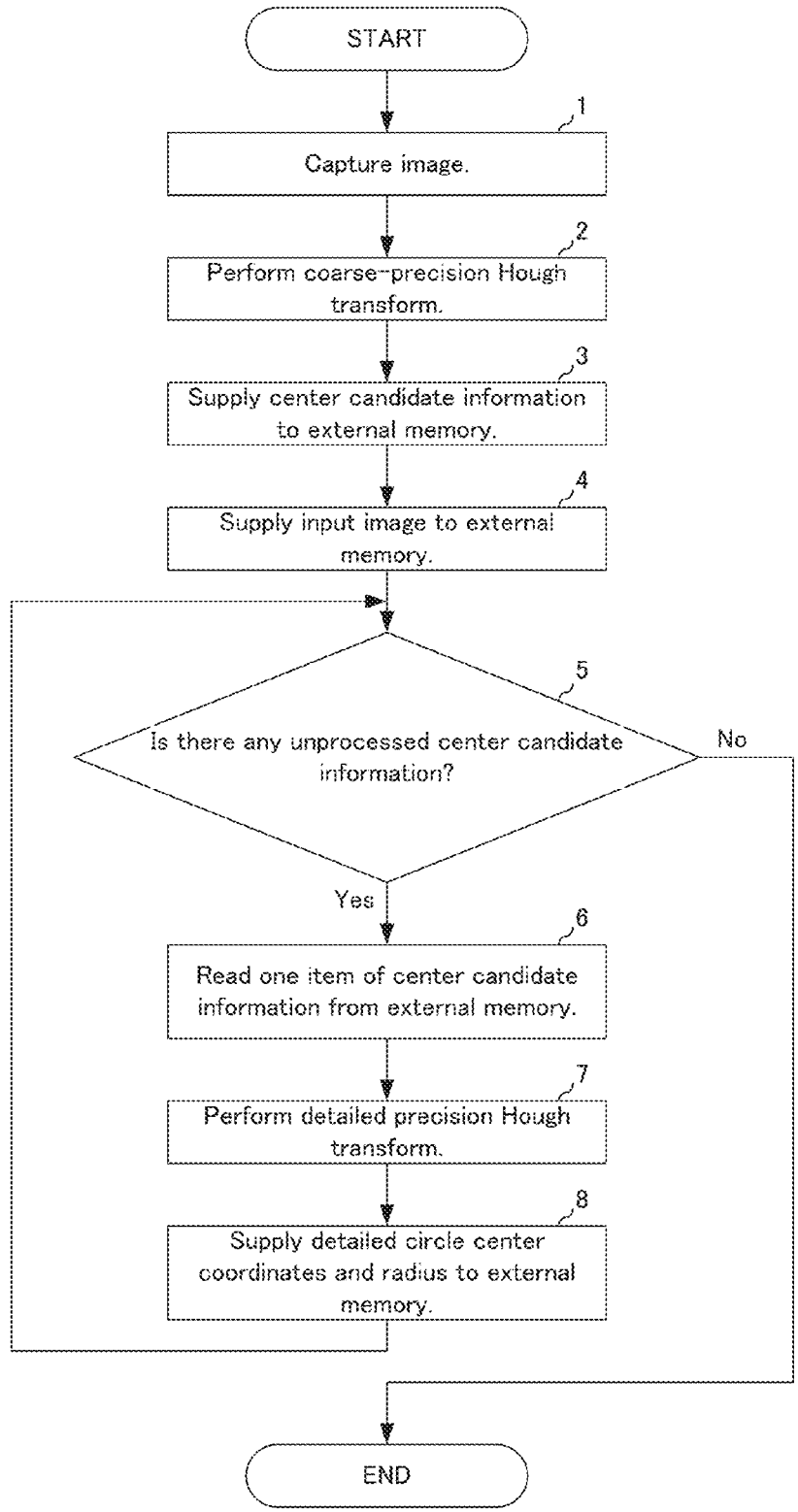
FIG. 8 is a flow chart for describing the operation in the present exemplary embodiment.

The operations of the present exemplary embodiment are next described. FIG. 8 is a flow chart for describing the operations in the present exemplary embodiment.

First, in Step 1, image input unit 101 performs the capture of an image. In Step 2, FPGA coarse Hough transform unit 102 next performs a coarse-precision Hough transform for the input image that was captured by image input unit 101, and in Step 3, supplies the obtained center candidate information to external memory 103. In Step 4, FPGA coarse Hough transform unit 102 also supplies the input image to external memory 103. Next, in Step 5, fine Hough transform unit 104 on a general-purpose processor investigates whether or not there is unprocessed center candidate information in external memory 103. When all processing is completed, the process ends.

If there is unprocessed center candidate information in external memory 103, fine Hough transform unit 104 takes in one item of center candidate information from external memory 103 in Step 6. Alternatively, fine Hough transform unit 104 in Step 7 reads image data of a corresponding local region from within the input image from external memory 103. Next, in Step 8, fine Hough transform unit 104 carries out a detailed-precision Hough transform, and in Step 9, supplies the result to external memory 103.

As described hereinabove, the present exemplary embodiment enables the realization of an incorporated image recognition apparatus that recognizes two-dimensional patterns in real time from within an image. Thus, by carrying out a coarse-precision Hough transform on FPGA, temporarily storing the results of the coarse-precision recognition and the input image in external memory 103, and using the coarse-precision recognition results and input image that were stored in external memory 103 to carry out a detailed-precision Hough transform on a general-purpose processor, the characteristics of the allotted processing are matched with the characteristics of the hardware such as shown in FIG. 9 to enable processing in real time.

Figure 10:
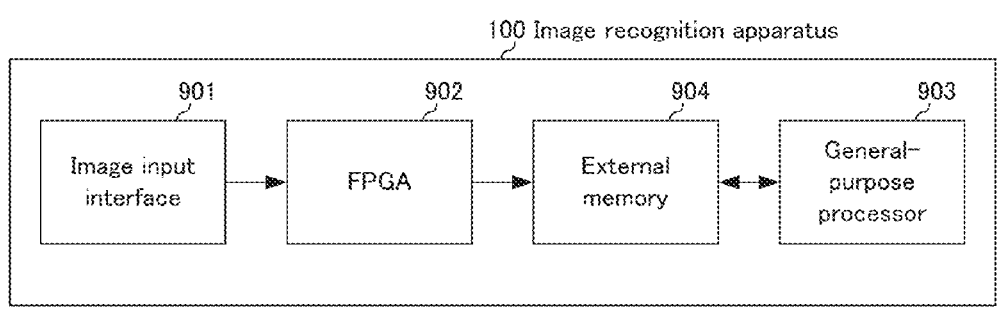
FIG. 10 shows the hardware configuration of the present exemplary embodiment.

The above-described image recognition apparatus is made up of image input interface 901, FPGA 902, general-purpose processor 903, and external memory 904, such as shown in FIG. 10. However, general-purpose processor 903 may be a component constituted by including its core as a hard macro in FPGA 902.

Although the operations, when recognizing a circle as a two-dimensional pattern, have been described as an example in the present exemplary embodiment, the present invention can be applied to any two-dimensional pattern including polygons such as triangles and rectangles if the pattern is a two-dimensional figure whose shape is known beforehand. This is because the generalized Hough transform construction that is used in FPGA coarse Hough transform unit 102 and fine Hough transform unit 104 can be applied to any two-dimensional pattern that has been determined in advance. In addition, in the case described above in which a circle is recognized, a case of voting for bins having a possibility of containing the center of a circle was described by way of example, but the voting may also be for bins having a possibility of containing the upper left point of a circumscribed rectangle or may also be for bins having a possibility of containing other points of a circle. Expanding on a typical case, when recognizing any two-dimensional pattern, the points extracted by voting can be set to any point of the two-dimensional pattern.

Although it is assumed that FPGA coarse Hough transform unit 102 supplies the input image to external memory 103 in the present exemplary embodiment, image input unit 101 may also directly supply the input image to a region that is determined in advance.

In addition, in the present exemplary embodiment, the number of bin divisions in the vertical direction in the voting space contained in FPGA coarse Hough transform unit 102 was described as a value obtained by dividing the number of pixels in the vertical direction of the input image by the resolution in the vertical direction of the voting space. When the size of the input image is larger, or when the RAM block size of FPGA is smaller, the voting space for the coarse-precision Hough transform may, in some cases, be difficult to hold in a RAM block. In such cases, the number of bins in the vertical direction of voting space may be set to a value of 1 or 2 greater than the maximum vertical size of the two-dimensional pattern in the resolution of that voting space. More specifically, when the vertical size of an input image is assumed to be 480 pixels and the resolution of the voting space in FPGA coarse Hough transform unit 102 is assumed to be six-pixel units of the input image, the number of bin divisions in the vertical direction of the voting space is 480/6=80 in the present exemplary embodiment, but if the maximum vertical size of the two-dimensional pattern that is the object of recognition is 60 pixels, 60/6+2=12 may be taken as the number of bin divisions in the vertical direction of voting space regardless of the size of the input image. As the method of determining whether or not to make the number of bin divisions greater by 1 or greater by 2 than the maximum vertical size of two-dimensional patterns in the resolution of voting space, the value should be made greater by 1 when the remainder of the value obtained by dividing the maximum vertical size two-dimensional patterns by the resolution of voting space is 1 and otherwise made greater by 2. The reason for this method is based on the principles described below.

Figure 11:
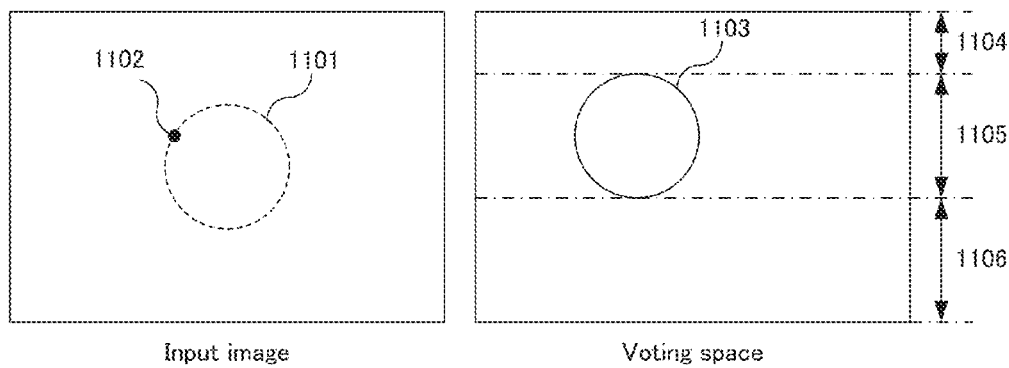
FIG. 11 shows an example of points relating to voting that are extracted from an input image and an example of the vote destination and voting range for these points (only votes when a two-dimensional pattern of maximum size is assumed).

Explanation is next made with reference to FIG. 11, taking a Hough transform that extracts circles as an exercise. Normally, the process of a Hough transform that extracts circles involves scanning the pixels of an input image in raster-scan order and then casting a vote for a circular shape to voting space when the pixel being focused upon can be considered to correspond to an arc. FIG. 11 shows pixel 1103 for which a vote is cast as a pixel that has a possibility of being the center of a circle in the voting space when attention is focused on point 1102 that belongs to circle 1101 of the maximum size of objects of recognition. Originally, the voting space that is used when recognizing circles employs a three-dimensional space that contains axes of different radii, but it is here assumed that only a two-dimensional voting space is shown that corresponds to a circle of the maximum radius and that the resolution of the voting space is equal to that of the input image. As shown in FIG. 11, the range in the direction of the height of a pixel that is voted for point 1102 is range 1105, and no votes are cast for the higher range 1104 or the lower range 1106. In other words, it is sufficient only that the voting space corresponding to range 1105 be held while the voting process is being carried out for points on the same line as point 1102.

Figure 12:
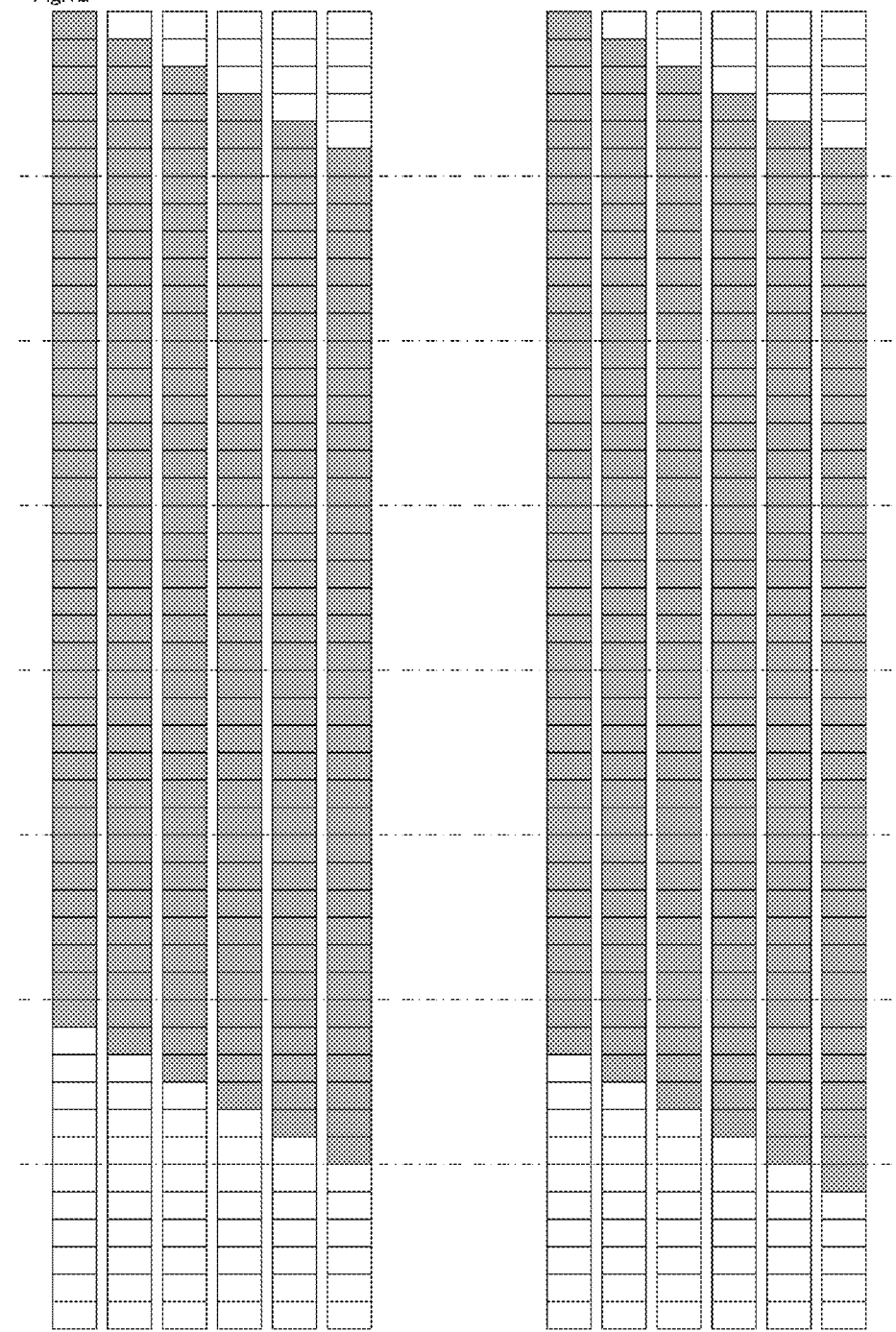
FIG. 12 shows the pattern of correspondence between the voting range and coarse-precision voting space.

FIG. 12 shows an example of the correspondence relation between range 1105 in the same resolution as the input image and the bins of the coarse-precision voting space (n (n≥2) dimension). The left figure of FIG. 12 shows the relation between range 1105 and the bins of the coarse-precision voting space when the resolution of the coarse-precision voting space is six-pixel units of the input image and the maximum vertical size of the two-dimensional pattern is 37 pixels on the input image, and the alternate long and short dash lines show the locations of bin divisions. At this time, the remainder of the value obtained by dividing the maximum vertical size of a two-dimensional pattern by the resolution of the voting space is 1 (=37/6=6 with a remainder of 1), and although six cases shown in the figure can be considered, in all of the cases, the voting ranges indicated by the grey areas straddle seven bins. Next, the right figure of FIG. 12 shows the relation between range 1105 and the coarse-precision voting space bins when the resolution of the coarse-precision voting space is six-pixel units and the maximum height of the two-dimensional pattern is 38 pixels on the input image. In this case, the voting range straddles a maximum of eight bins. In addition, although omitted in the figure, when the remainder of the value obtained, when the maximum vertical size of the two-dimensional pattern is divided by the resolution of the voting space, is 0 (for example, when the maximum vertical size is 36 pixels), the voting range straddles six or seven bins. When the remainder of the value obtained by dividing the maximum vertical size of a two-dimensional pattern by the resolution of the voting space is 2 or more, the number of divisions becomes a value that is greater by 2 than the maximum vertical size of a two-dimensional pattern in the resolution of the voting space, and is otherwise a value that is greater by 1 than the maximum vertical size of a two-dimensional pattern. Accordingly, if a voting space of the above-described vertical size is used, it is apparent that that the voting process can be carried out to the same voting space as normal for a point at specific Y coordinates of the input image.

If the vote value up to that point is held despite transitioning to the processing of the next line of an input image, a voting value can be obtained that is absolutely equivalent to a case of using voting space that corresponds to the entire input image. However, in order to proceed to the voting process for the next line of the input image, the voting space must be extended downward. However, the vertical size of the voting space is here limited to a value that is greater by 1 or 2 than the maximum vertical size of a two-dimensional pattern in the resolution of the voting space. A countermeasure to this limitation uses the fact that the uppermost line of the voting space is removed from the voting range either simultaneous with or before the need arises to extend the voting space downward. For example, when, during the processing of a particular Y coordinate line of the input image, the voting range is as the case of the right edge of the figure on the left of FIG. 12, the voting range descends below the second bin from the top, and votes are not cast into the bins of the uppermost lines. Accordingly, voting values are here investigated only for the bins of the uppermost lines, and n voting values starting from high voting values and including the already recognized portion that has been stored in the external memory are provisionally selected and stored. When a check of the voting values relating to the uppermost lines is completed, based on the operation principles of a ring buffer, the physically uppermost lines of the voting space may be used to store the voting values as lines that are virtually newly added below the voting space.

This type of correspondence can be easily realized by using a fixed correspondence table such as shown in FIG. 13. FIG. 13 shows a portion of the correspondence among the voting range, the input image Y coordinates and voting space y coordinates when the resolution of voting space is six-pixel units, the maximum height of the two-dimensional patterns that are the object of recognition is 50, the voting space for the entire input image can be held, and the number of bin divisions of voting space is 10 (=50/6+2). This means that, in the case of this example, while attention is focused on pixels for which the Y coordinate of the input image is 70, the bin corresponding to y=0 of the voting space corresponds to Y=60-65 of the coordinate system of the input image and the bin corresponding to y=1 corresponds to Y=66-71. Similarly, the bin of y=7 corresponds to Y=42-47. Further, after completion of the voting process that focuses on pixels of the input image for which the Y coordinate is 71, the ranges in which votes were cast are 8-9 and 0-6, and because the voting value held in the bin of y=7 no longer changes, the bin of Y=71 should be checked in the horizontal direction at the time of completion of the voting process focused on pixels for which the Y coordinate of the input image is 71 and n items, for which the voting values are always high including the already recognized portion that has been stored in memory, should be selected and stored. After storing, the value of the bin of y=7 is cleared to 0, and further, is reused to hold the voting values to the lines of Y=102-107 at the time of the voting process that focuses on the line of Y=77.

The typical relational expression of the vertical axis coordinate value Y of the input image coordinate system and the vertical axis coordinate value y of voting space is represented by:

$$y=((int(Y/\text{resolution of voting space}))\mod \text{number of bin divisions})$$

It is here assumed that int (a) is discarded and (a mod b) returns the remainder of dividing a by b.

Figure 14:
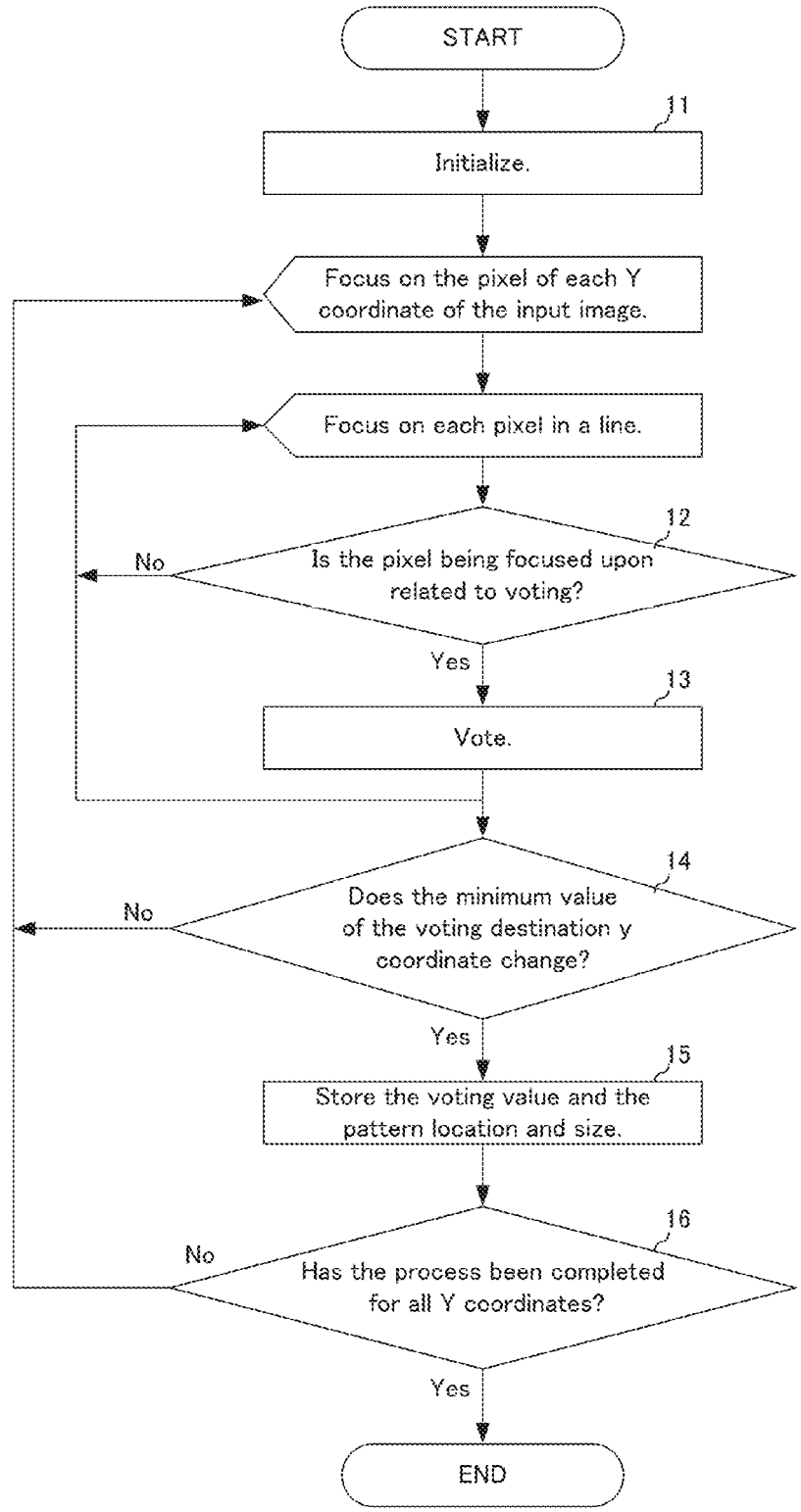
FIG. 14 is a flow chart for describing operations in an FPGA coarse Hough transform unit when the number of bin divisions in the vertical direction of voting space is a value that is 1 or 2 greater than the maximum vertical size of a two-dimensional pattern in the resolution of the voting space.

Description next regards the operation inside FPGA coarse Hough transform unit 102 when the number of bin divisions in the vertical direction of voting space is a value greater by 1 or 2 than the maximum vertical size of the two-dimensional pattern in the resolution of the voting space referring to FIG. 14.

In Step 11, FPGA coarse Hough transform unit 102 first performs the initialization of the table that shows the correspondence relation between the Y coordinates of the input image and the y coordinates of the voting space such as shown in FIG. 13 and the initialization of the voting space. FPGA coarse Hough transform unit 102 next successively focuses on pixels of each Y coordinate of the input image and carries out the following process. In Step 12, FPGA coarse Hough transform unit 102 judges whether or not the pixel being focused on is a pixel that relates to voting, and in Step 13, upon having judged that a pixel relates to voting, calculates the vote destination in voting space while referring to the table that shows the correspondence relation between the Y coordinates and the y coordinates of voting space and thus casts a vote. When a pixel being focused upon is a pixel that does not relate to voting or when voting has been completed, FPGA coarse Hough transform unit 102 focuses on neighboring pixels one after another and repeats the same process. When the voting process of a one-line portion of the input image is completed, FPGA coarse Hough transform unit 102 in Step 14 refers to the table that shows the correspondence relation between the Y coordinates of the input image and the y coordinates of the voting space and judges whether or not the minimum value of the voting destination y coordinate for the Y coordinate increases by 1 from the current Y coordinate to the next Y coordinate. When the minimum value increases by 1 from the current Y coordinate to the next Y coordinate, FPGA coarse Hough transform unit 102 in Step 15 extracts the bin having high voting value for the column of bins for the minimum value of the voting destination y coordinate in the current Y coordinate and stores the pattern location and size that correspond to the voting value and bin in external memory 103. After storing the pattern location and size in external memory 103, FPGA coarse Hough transform unit 102 clears the value of the bin to 0 and repeats the processing of Step 12 and succeeding steps while focusing on the next Y coordinate. In Step 16, if focus on all Y coordinates of the input image has been completed, FPGA coarse Hough transform unit 102 supplies the voting values and location information that have been stored in external memory 103 as the output of FPGA coarse Hough transform unit 102. When extracting the bins having high voting values, FPGA coarse Hough transform unit 102 may always store pattern locations and sizes that correspond to a fixed number of voting values and bins from items having high voting values including items that have already been stored in external memory 103, or may adopt a method of storing in external memory 103 all information of bins having a voting value that is greater than a threshold value that has been determined in advance.

Although a process of recognizing circles was described by way of example in the foregoing explanation, coarse-precision location and size information can be obtained by absolutely the same method for figures such as triangles or other shapes, given that only the shape is known beforehand. In addition, although the number of bin divisions on one side of the voting space in the description above was a value that is 1 or 2 greater than the maximum vertical length of the two-dimensional pattern in the resolution of the voting space, the number of bin divisions may be made greater without causing problems. In addition, the number of bin divisions on one side of the voting space may be a value close to equal to the maximum vertical length of the two-dimensional pattern in the resolution of the voting space. Although such a case would entail the discarding of the voting values from pixels for the upper edge and lower edge of the two-dimensional pattern and raise concern over the difficulty of recognizing an object figure of the maximum size that is the object of recognition, depending on the application, these effects, can in some cases, be ignored. However, this approach has the effect of reducing the amount of memory consumption.

The present exemplary embodiment can be applied to an apparatus that takes round or triangular traffic signs as the objects of recognition. More specifically, the objects of recognition may include speed limit signs or no-parking signs that are surrounded by a red ring-shaped area, signs having a round blue background that indicate prohibited directions of travel, stop signs having an inverted triangular shape, and further, signs that are created by electric light displays. However, the present exemplary embodiment can be applied to the recognition of any object having a two-dimensional pattern and having a shape that has been prescribed beforehand and that is not limited to the recognition of traffic signs.

According to the present invention, a coarse-precision Hough transform of rough-fine Hough transforms is implemented on FPGA and a detailed-precision Hough transform is implemented on a general-purpose processor. By means of this configuration, not only is the need to hold an input image on FPGA eliminated, but also a detailed-precision Hough transform that involves less computation needs to be performed on a general-purpose processor having relatively slow computing speed. As a result, an incorporated image recognition apparatus can be realized that recognizes two-dimensional patterns from an image in real time.

In addition, the processing carried out by each constituent element provided in image recognition apparatus 100 may also be carried out by logic circuits that are each designed for specific purposes. A computer program (hereinbelow referred to as a program) that describes the processing content may be recorded as procedures on a recording medium that can be read to image recognition apparatus 100, and the program that is recorded on this recording medium may be read and executed by image recognition apparatus 100. The recording medium that can be read by image recognition apparatus 100 refers to a relocatable recording medium such as a floppy disk (registered trademark), a magneto-optical disk, a DVD, or a CD, or to HDD or memory that can be incorporated in image recognition apparatus 100 such as ROM or RAM. The program that is recorded on this recording medium is read to a CPU (not shown) that is provided in image recognition apparatus 100, and the same processes as those described hereinabove are then carried out under the control of the CPU. The CPU here operates as a computer that executes the program that was read from the recording medium on which the program is recorded.

Although the invention of the present application has been described hereinabove with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

All or a portion of the above-described exemplary embodiment can be described per the following notes, but are not limited to the following.

Note 1

An image recognition apparatus includes:

image input means that receives an image;

external memory that stores information;

FPGA coarse Hough transform means that performs, on a FPGA (Field-Programmable Gate Array), a first coarse-precision Hough transform upon an image that is received as input in the image input means, and supplies candidate location information that was obtained by the first Hough transform and the image to the external memory; and fine Hough transform means that operates on a general-purpose processor and that reads the candidate location information and the image that were stored in the external memory, uses the candidate location information to perform a second detailed-precision Hough transform upon the image, and supplies detailed-precision location information for two-dimensional patterns that are the object of recognition in the image to the external memory.

Note 2

In the image recognition apparatus described in Note 1:

the FPGA coarse Hough transform means carries out, as the first Hough transform, a Hough transform for each range that includes a predetermined plurality of pixels in the image, and the fine Hough transform means carries out, as the second Hough transform, a Hough transform for each pixel of the image.

Note 3

In the image recognition apparatus described in Note 1 or Note 2, the voting space included in the FPGA coarse Hough transform means is constituted using a ring buffer.

Note 4

In the image recognition apparatus described in Note 3, the number of bin divisions in the vertical direction of the voting space that is included in the FPGA coarse Hough transform means is a value that is greater by 1 or 2 than the maximum vertical size of the two-dimensional pattern in the resolution of the voting space.

Note 5

In the image recognition apparatus described in any one of Notes 1 to Note 4, the two-dimensional pattern is a traffic sign whose outer shape is round or triangular.

Note 6

A recording medium records a program for causing a computer to execute procedures of:

receiving an image;

performing, on a FPGA (Field-Programmable Gate Array), a first coarse-precision Hough transform upon the image that was received;

supplying candidate location information that was obtained in the first Hough transform and the image to an external memory; and causing execution of processes, on a general-purpose processor, of reading the candidate location information and the image that were stored in the external memory, using the candidate location information to perform a second detailed-precision Hough transform upon the image, and supplying detailed-precision location information for two-dimensional patterns that are the object of recognition in the image to the external memory.

What is claimed is:

1. An image recognition apparatus comprising:
   image input means that receives an image;
   external memory that stores information;
   FPGA coarse Hough transform means that performs, on a FPGA (Field-Programmable Gate Array), a first coarse-precision Hough transform upon an image that is received as input in said image input means, and supplies candidate location information that was obtained by said first Hough transform and said image to said external memory; and
   fine Hough transform means that operates on a general-purpose processor and that reads said candidate location information and said image that were stored in said external memory, uses the candidate location information to perform a second detailed-precision Hough transform upon the image, and supplies detailed-precision location information for two-dimensional patterns that are the object of recognition in said image to said external memory.

2. The image recognition apparatus as set forth in claim 1, wherein:
   said FPGA coarse Hough transform means carries out, as said first Hough transform, a Hough transform for each range that includes a predetermined plurality of pixels in said image, and
   said fine Hough transform means carries out, as said second Hough transform, a Hough transform for each pixel of said image.

3. The image recognition apparatus as set forth in claim 1, wherein the voting space included in said FPGA coarse Hough transform means is constituted using a ring buffer.

4. The image recognition apparatus as set forth in claim 3, wherein the number of bin divisions in the vertical direction of the voting space that is included in said FPGA coarse Hough transform means is a value that is greater by 1 or 2 than the maximum vertical size of the two-dimensional pattern in the resolution of said voting space.

5. The image recognition apparatus as set forth in claim 1, wherein said two-dimensional pattern is a traffic sign whose outer shape is round or triangular.

6. A non-transitory computer-readable recording medium that records a program for causing a computer to execute procedures of:
   receiving an image;
   supplying candidate location information that was obtained by a first coarse-precision Hough transform, which is performed on a FPGA (Field-Programmable Gate Array), upon said image that was received and said image to an external memory; and
   causing execution of processes, on a general-purpose processor, of reading said candidate location information and said image that were stored in said external memory, using the candidate location information to perform a second detailed-precision Hough transform upon said image, and supplying detailed-precision location information for two-dimensional patterns that are the objects of recognition in said image to said external memory.

* * * * *